US011576520B2

(12) United States Patent
Morend et al.

(10) Patent No.: US 11,576,520 B2
(45) Date of Patent: Feb. 14, 2023

(54) DISPENSER OF BULK MATERIAL

(71) Applicant: SOCIETE DES PRODUITS NESTLE S.A., Vevey (CH)

(72) Inventors: Joel Morend, Chatonnaye (CH); Lin Yang, Shanghai (CN)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 17/043,113

(22) PCT Filed: May 15, 2019

(86) PCT No.: PCT/EP2019/062435
§ 371 (c)(1),
(2) Date: Sep. 29, 2020

(87) PCT Pub. No.: WO2019/228800
PCT Pub. Date: Dec. 5, 2019

(65) Prior Publication Data
US 2021/0059465 A1     Mar. 4, 2021

(30) Foreign Application Priority Data

May 28, 2018   (EP) .................................... 18174477

(51) Int. Cl.
*A47J 31/40*     (2006.01)
*A47G 19/34*     (2006.01)
*A47J 42/50*     (2006.01)

(52) U.S. Cl.
CPC ............ *A47J 31/404* (2013.01); *A47G 19/34* (2013.01); *A47J 42/50* (2013.01)

(58) Field of Classification Search
CPC .......... A47J 31/404; A47J 42/50; A47G 19/34
(Continued)

(56) References Cited

U.S. PATENT DOCUMENTS 5,495,962 A      3/1996 Nomura
5,791,526 A  *   8/1998 Landais ................ A47J 31/404
                                                            222/185.1

(Continued)

FOREIGN PATENT DOCUMENTS

CN       102046052 A     5/2011
CN       103391737 A     11/2013
(Continued)

OTHER PUBLICATIONS

Indian Office Action for Appl No. 202017042222 dated Jul. 15, 2022.

(Continued)

*Primary Examiner* — Lien M Ngo
(74) *Attorney, Agent, or Firm* — K&L Gates LLP (57) ABSTRACT

The invention concerns A container (10) for storing, metering and dispensing bulk material, the container comprising: —a tank (1) to store the bulk material, said tank comprising a close top end and an opened bottom end, and said tank presenting an essentially cylindrical shape, —a dispensing closure (2) to dispense the bulk material from the opened bottom end of the tank, said dispensing closure comprising: an inner rotatable member (22) with at least one aperture (221), said inner rotatable member being rotatable around a longitudinal central axis (XX), and said inner rotatable member comprising central connecting means (223) designed to removably engage with a rotating shaft extending along the central axis (XX), an outer fixed member (21) with a central aperture (213) and at least one outlet aperture (211) therein, wherein the inner rotatable member (22) is configured for being selectively rotatable with respect to the outer fixed member (21) such that at least in one rotational position of the inner member, the at least one aperture (221) of the inner member overlaps with the at least one outlet aperture (211) of the outer fixed member for enabling the (Continued)

dispensing of the bulk material from the container, wherein the tank comprises at least one longitudinal straight rib (15) projecting inside the internal volume of the tank.

12 Claims, 6 Drawing Sheets (58) Field of Classification Search
USPC .......... 222/80, 142.1, 14.4, 142.9, 144, 452, 222/457.5; 215/382–385; 220/770, 676, 220/671
See application file for complete search history.

(56) References Cited

U.S. PATENT DOCUMENTS

| | | | |
|---|---|---|---|
| 5,934,516 A | | 8/1999 | Strycharske et al. |
| 5,947,171 A * | | 9/1999 | Woodruff ........... B65D 81/3211 |
| | | | 141/354 |
| 6,189,742 B1 | | 2/2001 | Thomson et al. |
| 7,886,684 B2 * | | 2/2011 | Cooper ................ B05B 7/2408 |
| | | | 118/323 |
| 8,313,005 B2 * | | 11/2012 | Scarola ................ B65D 23/102 |
| | | | 215/396 |
| 9,296,502 B1 * | | 3/2016 | Hollander ............... G01F 11/46 |
| 9,296,601 B2 * | | 3/2016 | Ismail ....................... B67D 7/22 |
| 10,499,558 B2 * | | 12/2019 | Stevenson ............. G05D 13/001 |
| 10,526,117 B2 * | | 1/2020 | Huss .................... B65D 47/261 |
| 10,961,002 B2 * | | 3/2021 | Mueggenborg ........ B65D 88/26 |
| 2002/0017502 A1 * | | 2/2002 | Renz .................. B65D 25/2897 |
| | | | 215/11.1 |
| 2009/0134111 A1 * | | 5/2009 | Schroeder .............. B65D 75/54 |
| | | | 215/10 |
| 2011/0032792 A1 | | 2/2011 | Liang et al. |

FOREIGN PATENT DOCUMENTS

| | | |
|---|---|---|
| CN | 103874440 A | 6/2014 |
| EP | 3028609 | 6/2016 |
| EP | 3384815 A1 * | 10/2018 |
| JP | 2003310444 | 11/2003 |
| JP | 2004295470 | 10/2004 |
| WO | WO 2011/082251 A1 * | 7/2011 |

OTHER PUBLICATIONS

China Patent Office Communication for Application No. 201980033156.0, dated May 26, 2022, 17 pages.

* cited by examiner

DISPENSER OF BULK MATERIAL

CROSS REFERENCE TO RELATED APPLICATIONS

The present application is a National Stage of International Application No. PCT/EP2019/062435, filed on May 15, 2019, which claims priority to European Patent Application No. 18174477.2, filed on May 28, 2018, the entire contents of which are being incorporated herein by reference.

FIELD OF THE INVENTION

The present invention relates to a container and a system for dispensing a bulk material, preferably a powder, particularly for the preparation of beverages by dilution of metered doses of soluble beverage powder.

BACKGROUND OF THE INVENTION

Beverage preparation machines designed for preparing beverages are well-known and commonplace in both domestic and commercial environments. These machines are generally configured for preparing cold or hot beverages on-demand, such as coffee or tea beverages in case the machine comprises a heating unit, or chilled drinks such as soft drinks or water. In the latter case, the machine may be equipped with a cooling unit.

A known principle in this field is the preparation of a beverage by means of a container containing a beverage ingredient, usually a powder, said container being connectable to the beverage preparation machine. Portioned amounts of beverage ingredient can be dispensed from the container during the beverage preparation process into a cup or into a mixing chamber of the machine. In the cup or the mixing chamber, a beverage is prepared by mixing the dosed amount of ingredients with a diluent such as water.

EP-A1-3 028 609 describes a container for storing and dispensing a bulk material, the container comprising:
  a tank, and
  a dispensing closure for dispensing the product from the tank comprising an inner rotatable disc member with at least one aperture, and an outer fixed disc member with a central aperture and at least one outlet aperture therein,
  wherein the inner disc member is configured for being selectively rotatable with respect to the outer disc member such that at least in one rotational position of the inner disc member, the at least one aperture of the inner disc member overlaps with the at least one outlet aperture of the outer disc member for enabling the dispensing of the product from the container.

This container can be positioned in the docking unit of a dosing machine configured for dispensing a dose of bulk material stored in the container. The machine comprises a rotary shaft configured to engage and selectively rotate the inner rotatable disc member of the dispensing closure when the container is connected to the machine.

Depending on the type of bulk material stored in the tank, it has been observed that, the bulk material stored above the dispensing closure and lying other the inner disc member rotates with said inner disc member when the latter rotates. As a result, bulk material does not fill correctly the outlet aperture of the outer disc member and the dosing is not consistent from one dosing operation to another. This problem was particularly noticed with instant coffee powders presenting a low density or a heterogeneous granulometry. This problem of consistent dosing directly affects the quality of the beverage produced from the dose of powder since the dose is usually defined to be mixed with another specific dose of diluent. If the dosing of the powder is inconsistent, the quality of the resulting beverage is inconsistent too.

In addition, in one embodiment of this type of container for storing and dispensing a bulk material, the dispensing closure can be removably attached to the tank in order to enable the refilling of the tank. Often, the container is refilled before it is completely empty that is while some doses of bulk material are still present in the tank. During the refilling operation, the container is oriented upside down and the dispensing closure is detached to get access to the bottom end of the tank and to pour new bulk material inside the tank before attaching back the dispensing closure to the bottom end of the tank and reversing the orientation of the container in its position of use. As a result, further to the refilling operation, the last doses of bulk material present in the tank before refilling are positioned at the top end of the tank, meaning there is a risk that after several refilling operations, the same old doses of bulk material are still present in the tank, which is not recommended.

U.S. Pat. No. 5,934,516 describes a container for storing and dispensing a bulk material, the container comprising:
  a tank, and
  a dispensing closure for dispensing the product from the tank comprising:
    an inner rotatable drum with two cylindrical compartments,
    a bottom closed end with a single opening designed to cooperate with at least one of said cylindrical compartments,
    a plate positioned above the inner rotatable drum and comprising two openings with kidney shape to guarantee full filling of the below compartments.

In order to break product bridges, a mechanical agitator is provided inside the tank. This agitator presents several drawbacks:
  the manufacturing is complex to the high number of mechanical pieces, in particular the mechanical agitator,
  there is a risk the mechanical agitator becomes blocked due to powder fines sliding inside the central opening of the rotatable drum and caking within,
  the cleaning is longer due to the high number of mechanical pieces and their complex shapes,
  in addition, the rotatable drum is not able to rotate 360° which does not guarantee the cylindrical compartments are fully filled and impacts the dosing accuracy.

An object of the invention is to address this problem of dosing consistency of the prior art containers whatever the bulk material they are filled with.

Another object of the invention is to address this problem of avoiding the too long presence of bulk material in the tank without dispensing.

SUMMARY OF THE INVENTION

In a first aspect of the invention, there is provided a container for storing, metering and dispensing bulk material, the container comprising:
  a tank to store the bulk material, said tank comprising a closed top end and an opened bottom end, and
  a dispensing closure to dispense the bulk material from the opened bottom end of the tank, said dispensing closure comprising:

an inner rotatable member with at least one aperture, said inner rotatable member being rotatable around a longitudinal central axis (XX) and said inner rotatable member comprising a central connecting means designed to removably engage with an external rotating shaft extending along the central axis (XX), an outer fixed member with a central aperture designed for the passage of the external rotating shaft and with at least one outlet aperture therein, wherein the inner rotatable member is configured for being selectively rotatable with respect to the outer fixed member such that at least in one rotational position of the inner member, the at least one aperture of the inner member overlaps with the at least one outlet aperture of the outer fixed member for enabling the dispensing of the bulk material from the container, wherein the tank comprises at least one longitudinal straight rib projecting inside the internal volume of the tank.

The container is configured for storing bulk material like a powder, free flowing particles, pellets, granulates, granules or grains. Preferably the bulk material is a soluble beverage powder like instant coffee, milk, creamer, chocolate, coffee mixes, fruit powder, soup or instant tea or like pellets of such powders or coffee beans. In addition to storing such a bulk material, the container allows easy unloading of a dose of the material from the container in order to deliver said dose to a beverage preparation machine once a beverage is ordered.

The container of the present invention comprises essentially a tank; the function of the tank is to be filled with and to store the bulk material. The tank usually comprises a lateral side wall, a top closed wall and an opened bottom.

Any global shape of tank can be used. Yet in order to facilitate the cleaning and drying of the tank by an operator, it is generally preferred to design the global section of the tank with rounded walls devoid of angular parts.

In one preferred embodiment, the lateral side wall of the tank can present a globally cylindrical shape presenting a round section.

The tank can be made of a transparent material, such as a transparent plastic. Such a transparent part enables the control of the level of the remaining bulk material inside the container when this one is used.

The internal volume of the tank is devoid of any mobile mechanical device such as any device for agitating bulk material.

The opened bottom of the tank is closed by the dispensing closure. This dispensing closure simultaneously closes and, on demand, doses and dispenses a dose of bulk material from the tank.

This dispensing closure comprises an outer fixed member and an inner rotatable member. Generally, for each of these both members, at least a part of the member is a plate, sheet or disc, and the parts of these members are able to slide one along the other.

The outer fixed member is placed outside the container compared to the other inner member. This outer fixed member is attached to the opened bottom of the tank and, once attached, remains immobile in respect of the tank.

The outer fixed member comprises at least one outlet aperture through which the bulk material is dispensed. This aperture is positioned between the center of the member and its lateral edge. According to one preferred embodiment, the outer fixed member comprises one outlet aperture only. As a result, this single aperture is able to cooperate with a precise zone of dispense of the bulk material. The surface of said at least one aperture defines the smallest dose that can be metered and dispensed from the container. Multiples of this smallest dose can be dispensed according to the total angular rotation of the inner rotatable member. Fine tuning of dosing can be achieved.

The outer fixed member presents another opening in its centre so that an external actuating rotary shaft of a motor is able to pass through said opening and freely cooperate with the inner rotatable member. Accordingly, the inner member can be rotated while the outer member remains immobile.

By external, it is meant that the actuating rotary shaft does not extend inside the container, in particular inside the tank of the container, except the end of the shaft that is connectable to the inner member.

The dispensing closure comprises an inner rotatable member with at least one aperture. Preferably the inner rotatable member comprises several apertures, said apertures being regularly angularly spaced and presenting the same internal shape. Having several apertures enables dosing of an important quantity of bulk material with a small angular rotation of the inner rotatable member and, as a result, in a short time.

The inner rotatable member is placed inside the container compared to the other outer fixed member. The upper surface of the inner rotatable member faces the internal volume of the container. Bulk material stored in the container lies on the upper surface of the inner rotatable member.

The inner member presents a central connecting means configured for cooperating with a rotary shaft external to the container. This connecting means is preferably placed at the centre of the inner member. Usually the external rotary shaft is configured to enable the rotation of the inner member along any angle up to 360°.

The inner member is configured for being selectively rotatable with respect to the outer member such that, at least in one rotational dispensing position of the inner member, the at least one aperture of the inner member overlaps with the at least one outlet aperture of the outer member to enable the dispensing of the bulk material from the container. The dispensing happens by gravity fall.

According to one preferred embodiment, the at least one aperture in the inner rotatable member is an indentation in the lateral side edge of the inner member.

As a consequence, the space defining the aperture is opened on one part of its outline and, once the inner rotatable member is dismounted from the other parts of the container, it is easy for an operator to introduce a cleaning tissue inside the aperture to get an efficient cleaning.

Preferably, the indentation has an outline presenting soft curves. Accordingly powder is prevented from remaining blocked in acute angles.

As mentioned above, the volume of the indentation between its own internal edge and the lateral side wall of the tank defines the minimal dose of bulk material that can be dispensed from the container.

According to the preferred embodiment, the container is non-disposable. It can be refilled with bulk material.

According to the preferred variant, the container comprises elements enabling the removable connection of the tank and the dispensing closure. Accordingly, the container can be refilled by disconnecting the tank from the dispensing closure, filling the tank with bulk material and then reassembling the tank and the dispensing closure. These removably connecting elements can be cooperating cams and cam tracks, screw threads, bayonet type elements or any other equivalent means provided on the surfaces of the tank and of the outer fixed member of the dispensing closure. Dismantling enables cleaning and/or refilling of the tank.

According to a less preferred variant, the tank comprises a refillable opening. Accordingly, the tank can be refilled without disassembling the tank and the dispensing closure, and even without removing the container from the beverage preparation system it is assembled to. The refillable opening can be any opening provided in the wall of the tank. It is usually closed by a removable cover. For example, the tank can be refilled through the opening by a refill cartridge of bulk material such as disclosed in WO 2009/000810.

According to another embodiment, the container can be disposable.

Preferably, the upper central surface of the inner rotatable member presents the shape of a cone, said cone rising within the internal volume of the tank and guiding the bulk material to the lateral side edge of the rotatable inner member.

Accordingly as the level of bulk material decreases in the tank, bulk material is urged to slide along the slope of the cone to the lateral side of the tank where it is trapped in the at least one aperture of the inner rotatable member when said member rotates.

According to the preferred embodiment, this cone is centred above the upper surface of the cavity of the inner rotatable member The tank comprises at least one longitudinal straight rib projecting from the lateral wall of the tank inside the internal volume of the tank.

This rib is straight and longitudinal meaning that it extends along a direction oriented from the bottom to the top of the tank.

This rib projects inside the internal volume of the tank: it projects sufficiently inside the internal volume of the tank so as to prevent the bulk material from rotating with the inner rotatable member of the dispensing closure when the latter rotates. The size of the rib extending inside the internal volume of the tank can depend from the size of the tank. For example, for a tank presenting essentially the shape of a cylinder with an internal diameter of about 70 to 90 mm, preferably, the rib extends from the internal surface of the tank inside the internal volume of the tank by about 10 mm. By preventing the bulk material from rotating with the inner rotatable member—especially when a small quantity of bulk material remains in the tank—the consistency of the dosing of bulk material is improved.

In addition to improving dosing consistency, it has been observed that this rib provides a mixing function of the bulk material stored in the tank.

Usually, the rib extends from the top end of the tank to the bottom end of the tank.

The transversal section of the rib can present various shapes. Preferably, the transversal section of the rib presents a round outline shape. This shape facilitates manufacturing (in particular if manufacturing is injection moulding) and cleaning.

Generally the transversal section of the rib is essentially constant other the whole length of the tank. Yet, due to manufacturing constraints (in particular demoulding further to injection moulding manufacturing process), the transversal section can slightly vary (in particular decrease) from the bottom end to the top end.

According to the preferred embodiment, the tank comprises one rib and the dispensing closure comprises one outlet aperture in the outer fixed member for enabling the dispensing of the product from the container, and the angular position of the rib is opposed to the angular position of the outlet aperture of the outer fixed member.

According to the preferred embodiment, at least in the lower part of the tank, the transversal section of the tank presents a circular shape with the rib projecting inside the internal section of the circular shape.

The other upper part of the tank can present a different transversal section without affecting the dosing consistency provided by this preferred embodiment. Yet, preferably, the transversal section of the tank presents a circular shape with a rib projecting inside the internal section of the circular shape from the bottom to the top of the tank.

Usually, the tank is filled with a soluble beverage powder such as instant coffee, instant tea, milk, fruit powder or creamer powder, chocolate powder. Even if this powder presents a high density, for example an untapped density above 700 g/l or a heterogeneous granulometry, the problems of inconsistent dosing have been improved. For example, dense soluble beverage powders like soluble instant tea or fruit powders or heterogeneous soluble beverage powders made of different ingredients like 3-in-1 mixes comprising milk, coffee and sugar powders were dosed from the container consistently.

In a second aspect, there is provided a system for dispensing bulk material, said system comprising a container such as described above and an apparatus for dispensing a dose of bulk material from the container, said apparatus comprising:
  a receiving area to receive the container in the apparatus,
  a dispensing area to dispense a dose of bulk material,
  a rotatable shaft to rotate the inner rotatable member of the container, the end of said shaft being designed to cooperate with the central connecting means of the inner rotatable member of the container, and
  a motor to actuate the rotatable shaft.

According to one embodiment, the system is configured for preparing a beverage, and
  the container stores a soluble beverage ingredient, and
  the apparatus comprises a beverage preparation chamber connected to at least one liquid supply, the dispensing area comprising said beverage preparation chamber so that a dose of soluble beverage ingredient is dispensed from the container in the chamber.

According to another embodiment, the system is configured for preparing a beverage, and
  the container stores a soluble beverage ingredient, and
  the dispensing area of the apparatus is configured for positioning a drinking receptacle so that a dose of soluble beverage ingredient is dispenser in said drinking receptacle, and
  the apparatus comprises a liquid supply and said liquid supply is configured for dispensing liquid in said drinking receptacle at the dispensing area.

Usually the liquid supply of the different systems supplies water.

According to a third aspect, there is provided the use of the container such as described above to store, dose and dispense a soluble beverage ingredient.

In the present application the terms "inner", "outer", "upper", "lower", "top", "bottom", "external" and "lateral" are used to describe the relational positioning of features of the invention. These terms should be understood to refer to the container in its normal orientation when positioned in an apparatus for the dispensing of bulk material production as shown in following FIGS. 1a and 4.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1A:
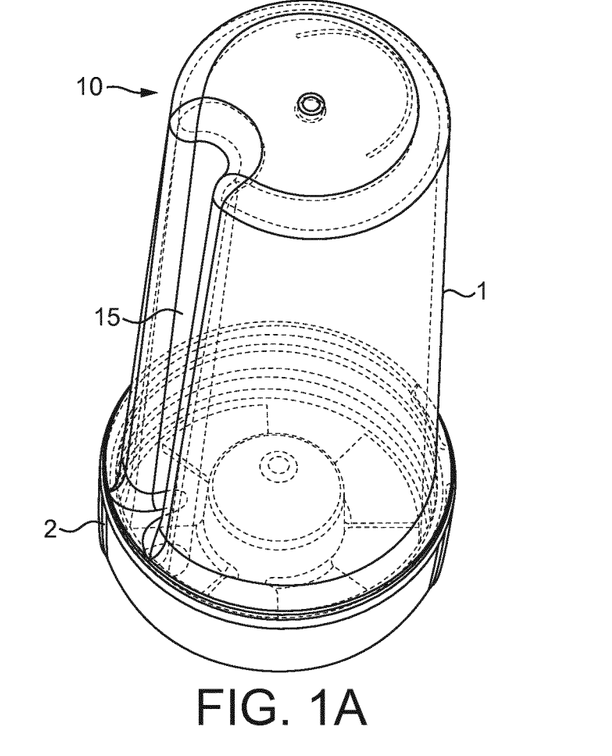
FIG. 1A is a top view of a container according to the invention.
Figure 1B:
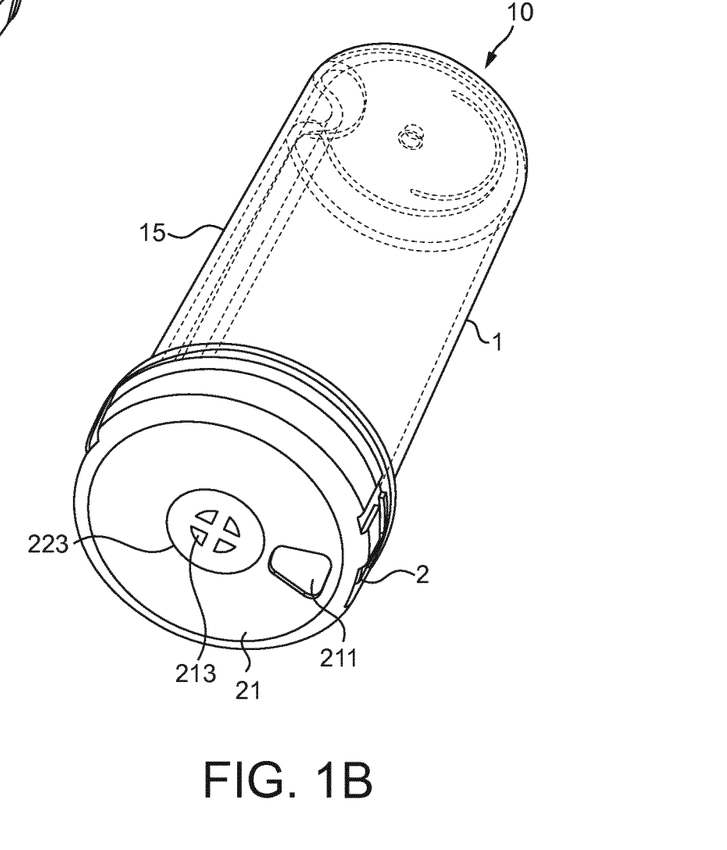
FIG. 1B is a bottom view of the container of FIG. 1A.

FIGS. 1A and 1B illustrate a container 10 according to the invention. The container comprises a tank 1 defining an interior volume for storing a bulk material. In the illustrated embodiment, the tank is made of transparent material. Accordingly, the level of bulk material can be visually controlled. The tank 1 presents a globally cylindrical shape—which is the preferred shape yet other shapes can be implemented—and comprises a longitudinal straight rib 15 extending from the bottom to the top of the tank and projecting inside the internal volume of the tank.

The bottom of the tank is closed by a dispensing closure 2. This dispensing closure forms the bottom of the tank and enables the dispensing and dosing of bulk material. The dispensing closure 2 comprises an outer member 21 with one outlet aperture 211 therein and enabling the dispensing of bulk material therethrough. During the normal dispensing operation of the container, this outer member 21 is fixed relatively to the tank 1.

As illustrated in FIG. 1B, preferably, the angular position of the rib 15 is is opposed to the angular position of the outlet aperture 211 of the outer fixed member.

As can be observed:
the container is devoid of any internal mobile mechanical device (powder agitator).
the bulk material lies directly on the upper surface of the inner rotatable member.

Figure 2:
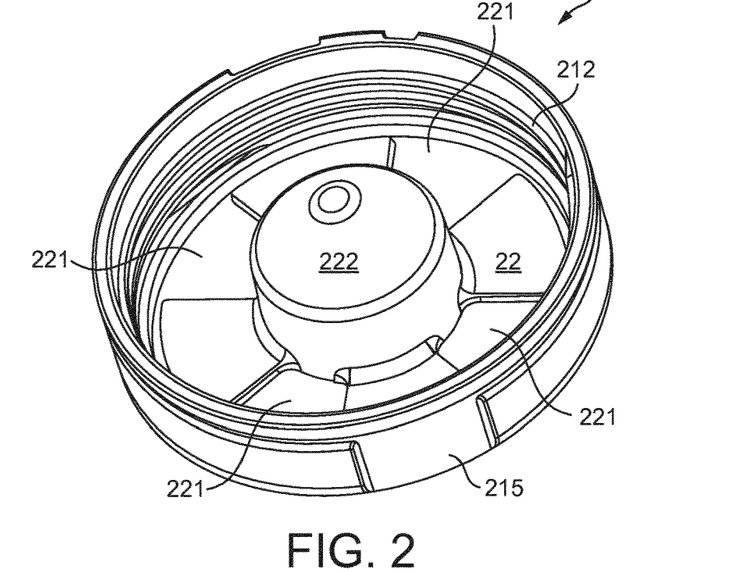
FIG. 2 is an isolated view of the dispensing closure of the container of FIGS. 1A and 1B.
Figure 3A:
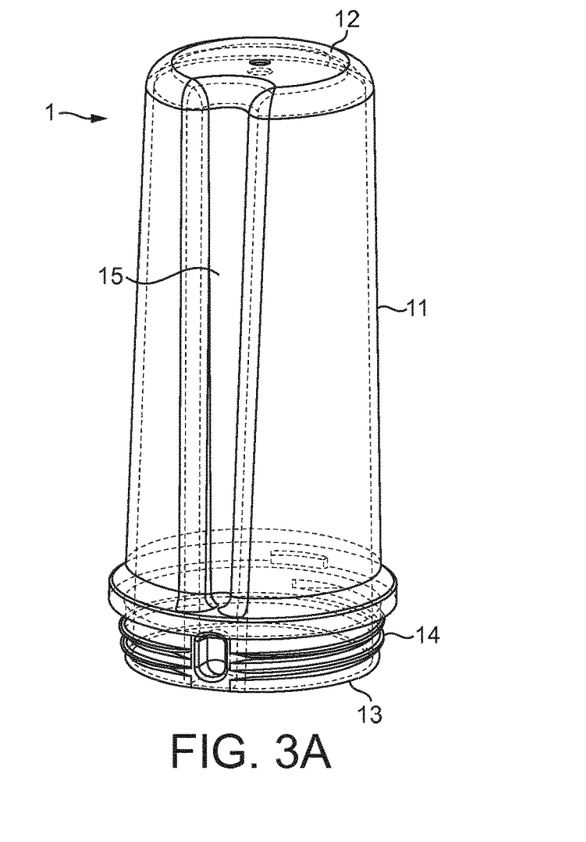
FIG. 3A is an isolated view of the tank of the container of FIGS. 1A and 1B.

As illustrated in FIGS. 2 and 3A, preferably, the tank 1 and the dispensing closure 2 are attached one to the other by removably connecting means, respectively screwing threads 14 close to the bottom 13 of the tank and corresponding screwing threads 212 at the outer member 21 of the dispensing closure. Although the container is illustrated in a dismountable configuration (this configuration presenting the advantage of enabling the refilling of the container), the container of the present invention can also be non-dismountable and disposable once it is empty. Either dismountable or not, the tank and the dispensing closure present the same following features except the presence of dismountable attachments.

As illustrated in FIG. 2, the dispensing closure 2 comprises an outer member 21. The dispensing member 2 comprises also an inner member 22 with at least one aperture 221 (exactly four apertures as illustrated in FIGS. 1a and 2). This inner member 22 is positioned above the outer fixed member 21 inside the volume of the container compared to the outer member. This inner member is able to be rotated along the upper surface of the outer member. The apertures 221 in the inner member 22 are designed so that, when the inner member 22 rotates with respect to the outer member 21, the apertures 221 of the inner member successively overlap with the outlet aperture 211 of the outer member to enable the dispensing of the bulk material from the container since bulk material lies above the surface of the inner member.

The inner member 222 is rotated by means of a rotating shaft that is external to the container: central connecting means 223 at the bottom of the inner member are able to be engaged by the end of said external rotating shaft. A central aperture 213 at the center of the outer member provides a passage for the end of the external rotating shaft so that this end cooperates with the central connecting means 223 of the inner member without interacting with the outer member. FIG. 1b illustrates the central connecting means 223 of the inner member.

Figure 3B:
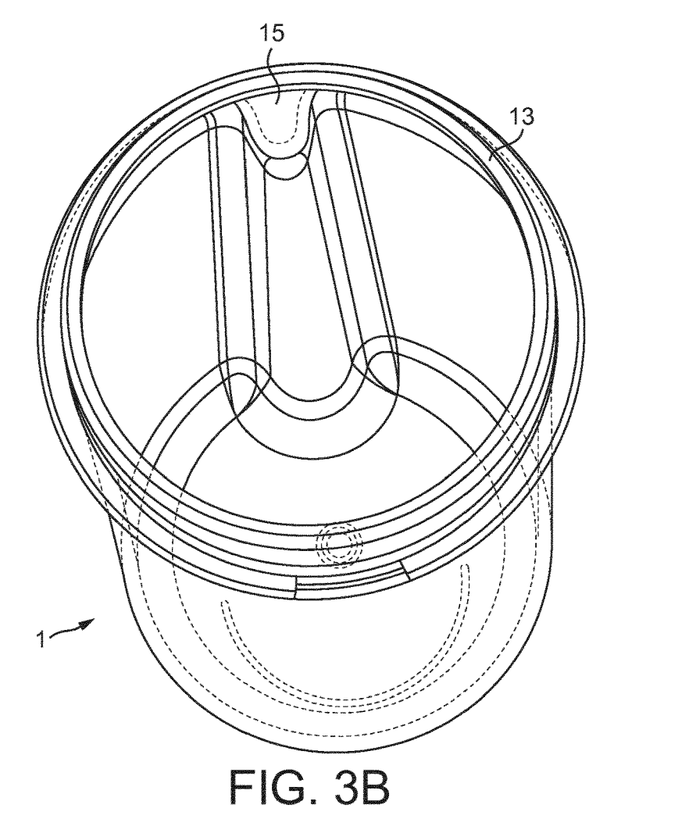
FIG. 3B is a bottom view of the tank of FIG. 3a, FIG. 3C is a view of the tank of FIG. 3B further to a cross-section in the middle of the length of the tank.
Figure 3C:
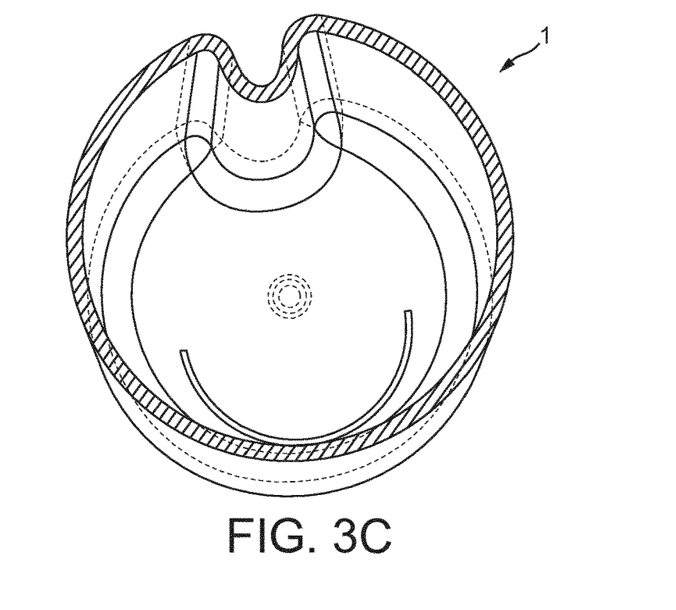

As illustrated in FIGS. 3A, 3B and 3C, the tank presents lateral and top walls 11, 12 and is opened at its bottom 13.

The tank comprises a longitudinal straight rib 15 extending from the bottom to the top of the tank and projecting inside the internal volume of the tank.

The rib extends from the bottom of the tank but without touching the inner rotatable member 22 of the dispensing closure and preventing or slowing the movement of the latter.

The preferred shape of the tank is a cylindrical shape with a circular transversal section comprising a rib projecting inside the internal volume of the tank. Preferably the rib presents a round shape and round outline. Yet, other shapes of the rib can be used.

It is apparent that the transversal sections of the rib and of the tank slightly varies from the bottom to the top of the tank. Yet this variation is due to manufacturing constraints only. As a result these sections can be kept constant from the bottom to the top of the tank without departing from the invention.

The rib 15 projects sufficiently inside the internal volume of the tank so as to prevent the bulk material from rotating with the inner rotatable member 22 of the dispensing closure when the latter rotates. Preferably, for a tank presenting a diameter of about 80 mm, the rib projects by at least 5 mm inside the internal volume. Preferably, the rib does not extend too much inside the tank which would have the result of slowing the movement of the bulk material at the bottom of the tank and creating a too important torque for the motor actuating the dispensing closure. Preferably, for a tank presenting a diameter of about 80 mm, the rib projects by at most 20 mm inside the internal volume.

The positive effect of the rib is particularly apparent when the level of bulk material in the tank reaches the lower part of the tank: bulk material does not tend to bridge or to form a block of material that is supported by the blades of the inner rotatable member 22 and that rotates more or less inside the tank while the bottom blade rotates which prevents the correct full filling of the dosing cavity 214. Actually the rib improves the correct filling of the cavity 214 even if the level of bulk material in the tank is low. As a result, the consistency of the dosing is good even if the level of bulk material in the tank becomes low.

In addition, it has been observed that the rib enables the mixing of the bulk material particles at the upper level of the mass of bulk material. This effect was demonstrated by completely filling the tank with alternative horizontal layers of two different powders differing by their color only (meaning same density and granulometry for both powders). In practice, the tank was filled with four alternative layers. Then, while dispensing the powders from the tank, the transparency of the tank enabled the control of the stability of the layers or not. It was noticed that when the level of bulk material in the tank reaches the lower part of the tank, the powders of different colours mixed together. It means that if the tank is refilled with fresh powder before fully emptying previous filled powder, said latter powder will be mixed with the fresh one and dispensed.

Figure 4:
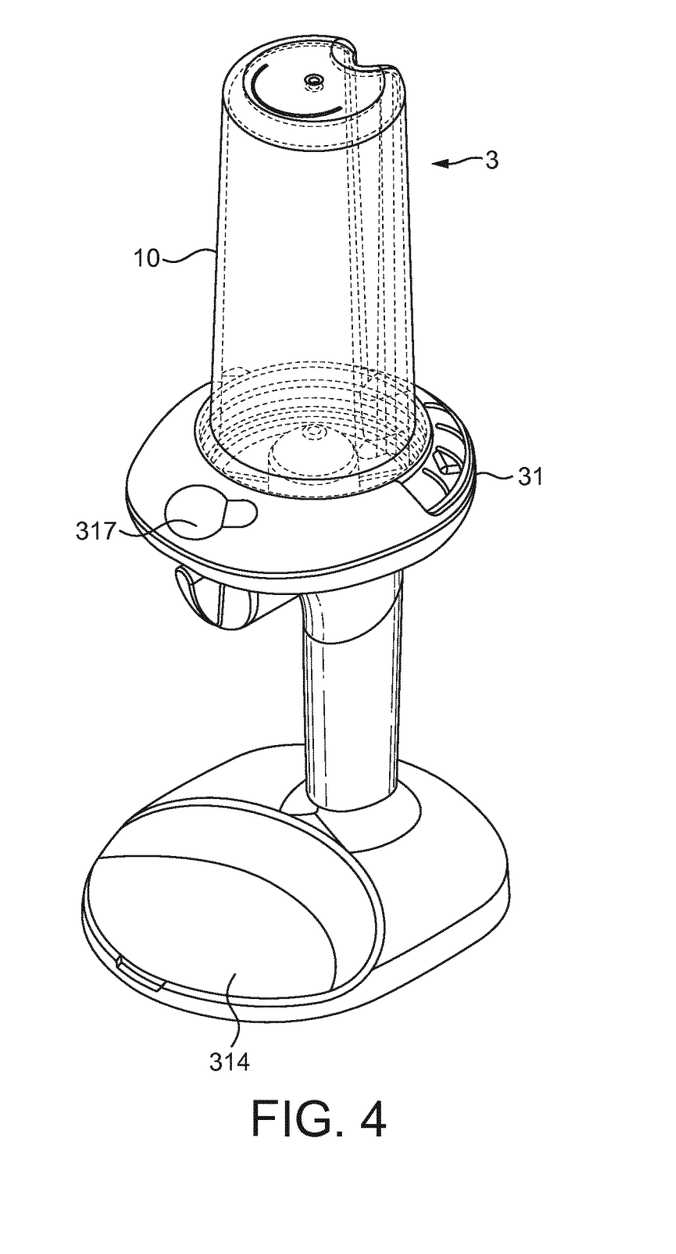
FIG. 4 is a view of a system of the container and an apparatus for dispensing bulk material according to the invention.

FIG. 4 illustrates a system 3 according to the invention comprising a container 10 and an apparatus 31 the container 10 is connectable to. The apparatus 31 doses and dispenses bulk material from the container 10 in a dispensing area 314 where a receptacle can be positioned. The apparatus comprises a motor for actuating a rotating shaft in response to an order of the operator, for example through a button. If the bulk material is a soluble beverage ingredient, water or any other diluent can be added to the receptacle to prepare a beverage.

Figure 5:
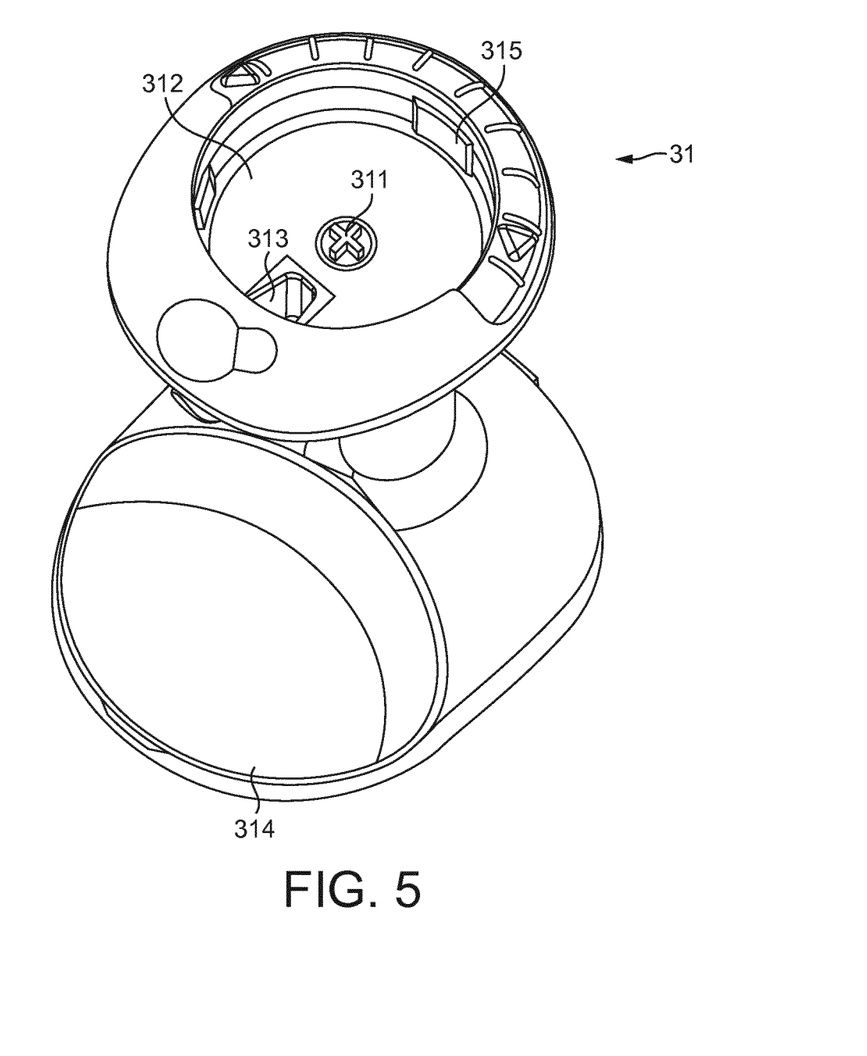
FIG. 5 is a view of the apparatus of FIG. 4 from which the container has been removed.

FIG. 5 illustrates the receiving area 312 of the apparatus. An aperture 313 is present to guide the dose of bulk material dispensed out of the outlet aperture of the container to the dispensing area 314. The end of a rotating shaft emerges from the surface of the receiving area in order to connect with the central connecting means of the inner rotating member of the container. The receiving area comprises orienting elements 315 to connect with corresponding orienting elements 215 (FIG. 2) at the external surface of the outer member of the dispensing closure so as to orient the outlet aperture 211 of the container to the aperture 313 of the apparatus. In the illustrated embodiment, these orienting elements are bumps and slots. Yet any other orienting means can be used such as any corresponding shapes.

Figure 6:
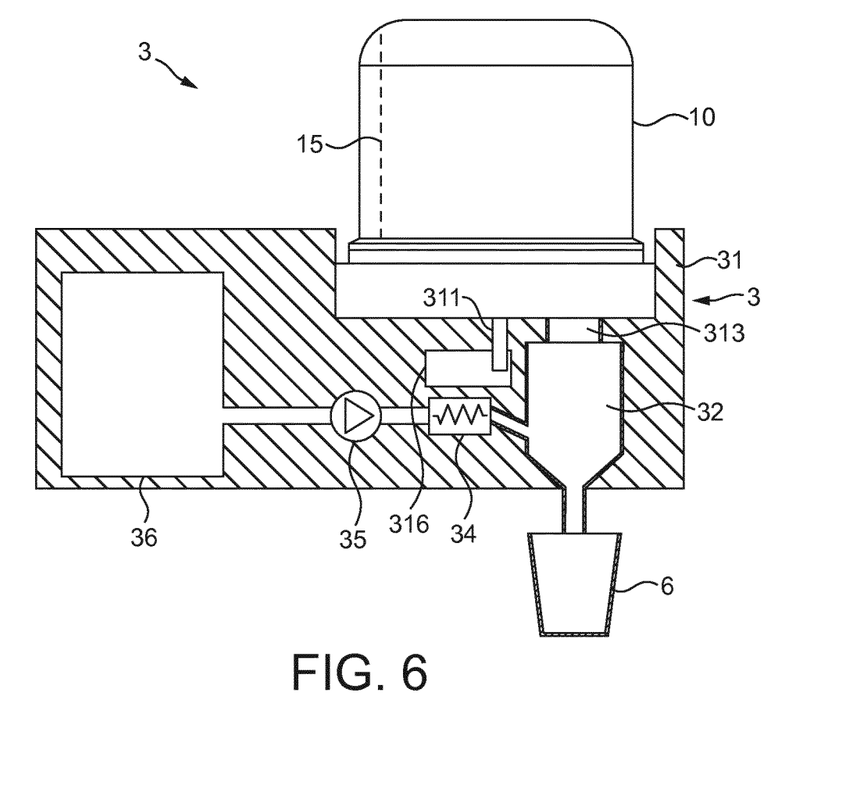
FIG. 6 is a schematic view of the container positioned in the dosing and docking unit of a beverage preparation system.

FIG. 6 schematically depicts a system 3 according to the invention comprising a container 10 and an apparatus 31 similar to the one described in FIGS. 4 and 5 except that the apparatus 31 comprises also a beverage preparation chamber 32. As illustrated the chamber 32 can be positioned at the dispensing area so that during dispensing of bulk material from the container 10, bulk material flows through said aperture in the chamber.

The apparatus comprises a liquid supply configured to introduce a diluent, preferably water, in the chamber 32. The liquid supply can comprise a liquid tank 36, a pump 35 and a heater 34 and/or a cooler (not represented).

During beverage preparation, a predefined amount of bulk material is first dispensed into the chamber 32 from the container 10. This is obtained by rotating the shaft 311 and dosing the required dose of bulk material that falls into mixing chamber. A diluent such as water is then provided from the tank 36 to the chamber 32. The resulting liquid beverage is then discharged from an outlet of the mixing chamber 32 into a receptacle 6.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS

| | |
|---|---|
| container | 10 |
| tank | 1 |
| lateral side wall | 11 |
| top wall | 12 |
| bottom | 13 |
| connecting element | 14 |
| rib | 15 |
| dispensing closure | 2 |
| outer fixed member | 21 |
| outlet aperture | 211 |
| connecting element | 212 |
| central aperture | 213 |
| orienting element | 215 |
| inner rotatable member | 22 |
| dosing aperture | 221 |
| cone | 222 |
| central connecting means | 223 |
| system | 3 |
| docking and dosing apparatus | 31 |
| shaft | 311 |
| receiving area | 312 |
| bottom aperture | 313 |
| dispensing area | 314 |
| orienting element | 315 |
| motor | 316 |
| button | 317 |
| beverage preparation chamber | 32 |
| heater | 34 |
| pump | 35 |
| liquid tank | 36 |
| receptacle | 6 |

The invention claimed is:

1. A container for storing, metering and dispensing a bulk material, the container comprising:
   a tank to store the bulk material, the tank comprising a close top end and an opened bottom end, and the tank presenting an essentially cylindrical shape,
   a dispensing closure to dispense the bulk material from the opened bottom end of the tank, the dispensing closure comprising:
   an inner rotatable member with at least one aperture, the inner rotatable member being rotatable around a longitudinal central axis and the inner rotatable member comprising a central connecting means designed to removably engage with an external rotating shaft extending along the longitudinal central axis,
   an outer fixed member comprising a central aperture designed for passage of the external rotating shaft, and the outer fixed member further comprising at least one outlet aperture,
   wherein the inner rotatable member is configured for being selectively rotatable with respect to the outer fixed member such that at least in one rotational position of the inner member, the at least one aperture of the inner member overlaps with the at least one outlet aperture of the outer fixed member for enabling dispensing of the bulk material from the container, and
   the tank comprises at least one longitudinal straight rib projecting inside an internal volume of the tank, and the at least one longitudinal straight rib extends inside the internal volume of the tank from the close top end of the tank to the opened bottom end of the tank.

2. The container according to claim 1, wherein a transversal section of the at least one longitudinal straight rib presents a round outline shape.

3. The container according to claim 1, wherein at least in a lower part of the tank, a transversal section of the tank presents a circular shape with the at least one longitudinal straight rib projecting inside an internal section of the circular shape.

4. A container for storing, metering and dispensing a bulk material, the container comprising:
- a tank to store the bulk material, the tank comprising a close top end and an opened bottom end, and the tank presenting an essentially cylindrical shape,
- a dispensing closure to dispense the bulk material from the opened bottom end of the tank, the dispensing closure comprising:
  - an inner rotatable member with at least one aperture, the inner rotatable member being rotatable around a longitudinal central axis and the inner rotatable member comprising a central connecting means designed to removably engage with an external rotating shaft extending along the longitudinal central axis,
  - an outer fixed member comprising a central aperture designed for passage of the external rotating shaft, and the outer fixed member further comprising at least one outlet aperture,
  - wherein the inner rotatable member is configured for being selectively rotatable with respect to the outer fixed member such that at least in one rotational position of the inner member, the at least one aperture of the inner member overlaps with the at least one outlet aperture of the outer fixed member for enabling dispensing of the bulk material from the container, and
- the tank comprises at least one longitudinal straight rib projecting inside an internal volume of the tank, wherein an angular position of the at least one longitudinal straight rib is opposed to an angular position of the at least one outlet aperture of the outer fixed member.

5. The container according to claim 1, wherein the tank is filled with a soluble beverage ingredient.

6. The container according to claim 1, wherein the dispensing closure is removably attached to the opened bottom end of the tank.

7. A system for a dispensing bulk material, the system comprising a container for storing, metering and dispensing the bulk material, the container comprising:
- a tank to store the bulk material, the tank comprising a close top end and an opened bottom end, and the tank presenting an essentially cylindrical shape,
- a dispensing closure to dispense the bulk material from the opened bottom end of the tank, the dispensing closure comprising:
  - an inner rotatable member with at least one aperture, the inner rotatable member being rotatable around a longitudinal central axis and the inner rotatable member comprising a central connecting means designed to removably engage with an external rotating shaft extending along the longitudinal central axis, and
  - an outer fixed member comprising a central aperture designed for the passage of the external rotating shaft, and the outer fixed member further comprising at least one outlet aperture,
  - wherein the inner rotatable member is configured for being selectively rotatable with respect to the outer fixed member such that at least in one rotational position of the inner member, the at least one aperture of the inner member overlaps with the at least one outlet aperture of the outer fixed member for enabling dispensing of the bulk material from the container,
- the tank comprises at least one longitudinal straight rib projecting inside an internal volume of the tank, and the at least one longitudinal straight rib extends inside the internal volume of the tank from the close top end of the tank to the opened bottom end of the tank; and
- an apparatus for dispensing a dose of the bulk material from the container, the apparatus comprising:
  - a receiving area to receive the container in the apparatus,
  - a dispensing area to dispense the dose of the bulk material,
  - a rotatable shaft to rotate the inner rotatable member of the container, an end of the rotatable shaft being designed to cooperate with a central connecting means of the inner rotatable member of the container, and
  - a motor to actuate the rotatable shaft.

8. The system according to claim 7, wherein:
the container stores a soluble beverage ingredient, and
the apparatus comprises a beverage preparation chamber connected to at least one liquid supply, the dispensing area comprising the beverage preparation chamber so that a dose of the soluble beverage ingredient is dispensed from the container in the beverage preparation chamber.

9. The system according to claim 7, wherein:
the container stores a soluble beverage ingredient, and
the dispensing area of the apparatus is configured for positioning a drinking receptacle so that a dose of the soluble beverage ingredient is dispensed in the drinking receptacle, and
the apparatus comprises a liquid supply configured for dispensing liquid in the drinking receptacle at the dispensing area.

10. The container according to claim 1, wherein an upper central surface of the inner rotatable member presents a shape of a cone, the cone rising within the internal volume of the tank and guiding the bulk material to a lateral side edge of the rotatable inner member.

11. The container according to claim 10, wherein the cone is centered above an upper surface of the at least one aperture of the inner rotatable member.

12. A system for a dispensing bulk material, the system comprising a container for storing, metering and dispensing the bulk material, the container comprising:
- a tank to store the bulk material, the tank comprising a close top end and an opened bottom end, and the tank presenting an essentially cylindrical shape,
- a dispensing closure to dispense the bulk material from the opened bottom end of the tank, the dispensing closure comprising:
  - an inner rotatable member with at least one aperture, the inner rotatable member being rotatable around a longitudinal central axis and the inner rotatable member comprising a central connecting means designed to removably engage with an external rotating shaft extending along the longitudinal central axis, and an outer fixed member comprising a central aperture designed for the passage of the external rotating shaft, and the outer fixed member further comprising at least one outlet aperture, wherein the inner rotatable member is configured for being selectively rotatable with respect to the outer fixed member such that at least in one rotational position of the inner member, the at least one aperture of the inner member overlaps with the at least one outlet aperture of the outer fixed member for enabling dispensing of the bulk material from the container, the tank comprises at least one longitudinal straight rib projecting inside an internal volume of the tank, wherein an angular position of the at least one longitudinal straight rib is opposed to an angular position of the at least one outlet aperture of the outer fixed member; and an apparatus for dispensing a dose of the bulk material from the container, the apparatus comprising:

a receiving area to receive the container in the apparatus, a dispensing area to dispense the dose of the bulk material, a rotatable shaft to rotate the inner rotatable member of the container, an end of the rotatable shaft being designed to cooperate with a central connecting means of the inner rotatable member of the container, and a motor to actuate the rotatable shaft.

* * * * *